(12) United States Patent
Tseng et al.

(10) Patent No.: US 10,986,580 B2
(45) Date of Patent: Apr. 20, 2021

(54) POSITIONING SYSTEM AND POSITIONING METHOD

(71) Applicants: I-Chun Tseng, Taipei (TW); Jui-Chun Shyur, Taipei (TW)

(72) Inventors: I-Chun Tseng, Taipei (TW); Jui-Chun Shyur, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 54 days.

(21) Appl. No.: 16/249,916

(22) Filed: Jan. 17, 2019

(65) Prior Publication Data
US 2019/0230593 A1 Jul. 25, 2019

Related U.S. Application Data

(60) Provisional application No. 62/619,112, filed on Jan. 19, 2018.

(51) Int. Cl.
*H04W 52/02* (2009.01)
*G06F 1/3296* (2019.01)
*G06F 1/3209* (2019.01)

(52) U.S. Cl.
CPC ...... *H04W 52/0245* (2013.01); *G06F 1/3209* (2013.01); *G06F 1/3296* (2013.01); *H04W 52/0229* (2013.01)

(58) Field of Classification Search
CPC .......... H04W 52/0245; H04W 52/0229; G06F 1/3296; G06F 1/3209
See application file for complete search history.

(56) References Cited

U.S. PATENT DOCUMENTS

| 9,301,307 | B1* | 3/2016 | Park | H04L 1/0015 |
| 2005/0277426 | A1* | 12/2005 | Evans | H04W 64/00 |
| | | | | 455/456.1 |
| 2011/0019562 | A1* | 1/2011 | Cattuto | G01S 5/0289 |
| | | | | 370/252 |

(Continued)

FOREIGN PATENT DOCUMENTS

| TW | 201126193 A1 * | 1/2010 | ............... G01S 5/02 |
| TW | 201126193 | 8/2011 | |
| TW | I554774 | 10/2016 | |

OTHER PUBLICATIONS

J. Blumenthal, F. Reichenbach and D. Timmermann, "Minimal Transmission Power vs. Signal Strength as Distance Estimation for Localization in Wireless Sensor Networks," 2006 3rd Annual IEEE Communications Society on Sensor and Ad Hoc Communications and Networks, Reston, VA, 2006, pp. 761-766. (Year: 2006).*

(Continued)

*Primary Examiner* — Phil K Nguyen
*Assistant Examiner* — Hyun Soo Kim
(74) *Attorney, Agent, or Firm* — JCIPRNET

(57) ABSTRACT

A positioning method adapted for a signal transmitting device and a server is provided. The positioning method includes: transmitting a reference signal by using the signal transmitting device having a low power mode and a high power mode; receiving the reference signal and determining a position of the signal transmitting device according to the reference signal and a signal strength and distance curve diagram by the server; and configuring the signal transmitting device to switch to one of the low power mode or the high power mode by the server.

8 Claims, 3 Drawing Sheets

(56) References Cited

U.S. PATENT DOCUMENTS

2016/0286502 A1* 9/2016 Sugitani .............. H04W 52/245
2017/0085120 A1* 3/2017 Leabman ................ H02J 5/005
2018/0041982 A1* 2/2018 Mulaosmanovic ... H04W 64/00
2018/0143287 A1* 5/2018 Dackefjord ......... H04W 68/005

OTHER PUBLICATIONS

"Office Action of Taiwan Counterpart Application", dated Jun. 12, 2019, pp. 1-5.

* cited by examiner

POSITIONING SYSTEM AND POSITIONING METHOD

CROSS-REFERENCE TO RELATED APPLICATION

This application claims the priority benefit of U.S. provisional application Ser. No. 62/619,112, filed on Jan. 19, 2018. The entirety of the above-mentioned patent application is hereby incorporated by reference herein and made a part of this specification.

BACKGROUND OF THE DISCLOSURE

Field of the Disclosure

The disclosure relates to a positioning system and a positioning method, in particular to a positioning system and a positioning method capable of saving power consumption.

Description of Related Art

The signal transmitting device used in the indoor positioning system typically transmits signals of communication protocol such as Bluetooth or Wi-Fi with a fixed transmission power. The indoor positioning system may receive the signal through the signal receiving device, and convert the received signal strength indicator (RSSI) of the signal into a distance, thereby achieving the effect of the positioning signal transmitting device. The RSSI decreases exponentially with the propagation distance. The greater the transmission power of the signal, the more sensitive the corresponding RSSI is to the change in distance and the higher the accuracy of the positioning.

If the indoor positioning system is to be arranged in a larger space, the distance between the signal transmitting device and the signal receiving device will be longer, and thus the accuracy of positioning will be lowered. Therefore, in order to maintain the accuracy of the positioning, the transmission power of the signal transmitting device is usually increased. However, increasing the transmit power will result in increased power consumption.

SUMMARY OF THE DISCLOSURE

The disclosure provides a positioning system including a signal transmitting device, a transceiver and a server. The signal transmitting device has a low power mode and a high power mode and transmits a reference signal. The transceiver receives the reference signal. The server is coupled to the receiver and stores a signal strength and distance curve diagram. The server determines the position of the signal transmitting device according to the reference signal and the signal strength and distance curve diagram, and configures the signal transmitting device to switch to one of the low power mode and the high power mode according to the position of the signal transmitting device by the transceiver.

The disclosure provides a positioning method adapted for a signal transmitting device and a server. The positioning method includes: transmitting a reference signal by using a signal transmitting device having a low power mode and a high power mode; receiving a reference signal by the server, and determining a position of the signal transmitting device according to the reference signal and the signal strength and distance curve diagram; and configuring the signal transmitting device to switch to one of the low power mode and high power mode according to the position of the signal transmitting device by the server.

Based on the above, the signal transmitting device of the present disclosure may have different power modes. If the position of the signal transmitting device is closer to the transceiver, the server may switch the power mode of the signal transmitting device to the low power mode while maintaining a certain positioning accuracy, thereby achieving power saving effect.

In order to make the aforementioned features and advantages of the disclosure more comprehensible, embodiments accompanying figures are described in detail below.

DESCRIPTION OF EMBODIMENTS

In order to maintain the positioning accuracy of the positioning system and reduce the power consumption of the signal transmitting device, the present disclosure provides a positioning system and a positioning method, which may achieve a perfect balance between power consumption and positioning accuracy by dynamically adjusting the power mode of the signal transmitting device.

Figure 1:
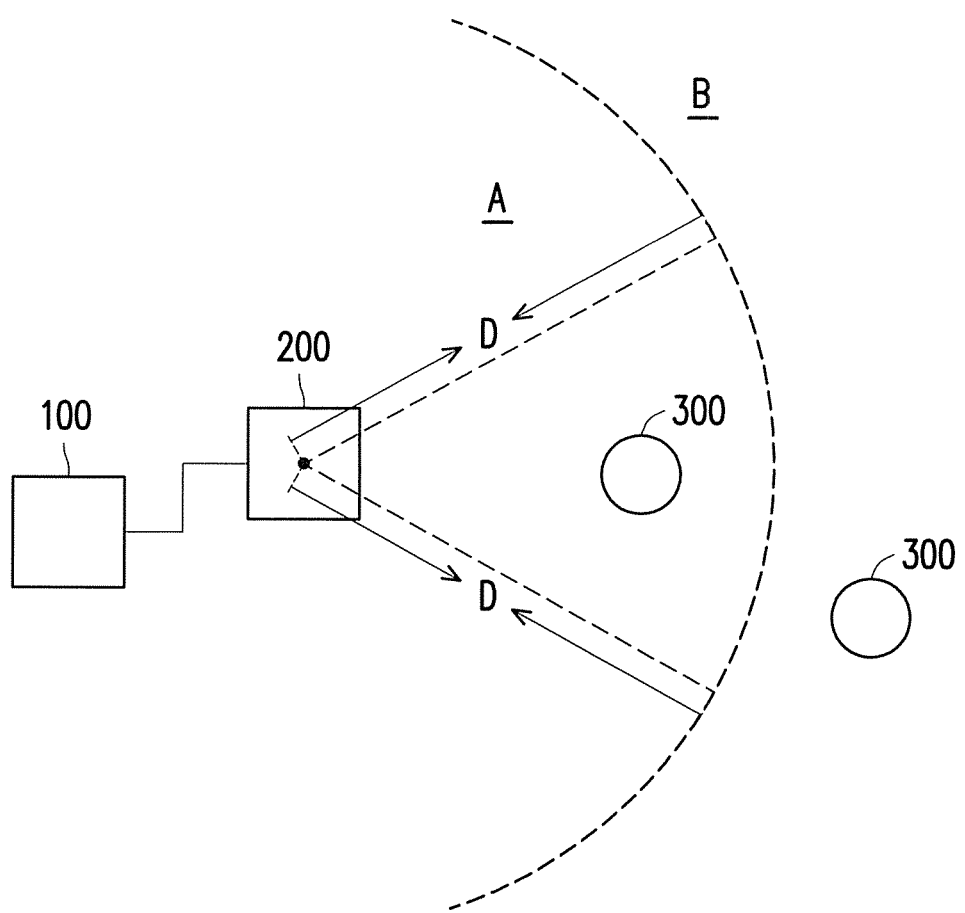
FIG. 1 is a schematic view of a positioning system according to an embodiment of the present disclosure.

FIG. 1 is a schematic view of a positioning system 10 according to an embodiment of the present disclosure. The positioning system 10 may include a server 100, a transceiver 200, and a signal transmitting device 300. The number and arrangement location of the server 100, the transceiver 200, and the signal transmitting device 300 may be adjusted by the user according to their needs, and the present disclosure provides no limitation in this regard.

The server 100 may have a processing unit (for example, a processor), a communication unit (for example, various communication chips, a Bluetooth chip or a Wi-Fi chip), and a storage unit (for example, a random access memory, a flash memory, or hard disk) and the like required to run the server 100.

The transceiver 200 is coupled to the server 100 and is communicatively connected to the signal transmitting device 300. Both the transceiver 200 and the signal transmitting device 300 may be configured to transmit and receive signals at frequencies such as radio frequency or millimeter wave frequencies. The transceiver 200 or the signal transmitting device 300 may have a processing unit (for example, a processor), a communication unit (for example, various communication chips, a Bluetooth chip or a Wi-Fi chip), and a storage unit (for example, a random access memory, a flash memory or a hard disk) or the like which are required for operating the transceiver 200 or the signal transmitting device 300. The transceiver 200 or the signal transmitting device 300 may also perform operations such as low noise amplifying, impedance matching, frequency mixing, up or down frequency conversion, filtering, amplifying, and so forth.

The signal transmitting device 300 may be a movable terminal device such as a mobile station, an advanced mobile station (AMS), a notebook computer, a personal digital assistant (PDA), a personal computer (PC), a telephone device, a pager, a camera, a handheld game console, a music device or a wireless sensor, etc., the disclosure is not limited thereto.

In this embodiment, the signal transmitting device 300 may be configured to transmit a reference signal, and the transceiver 200 may be configured to receive a reference signal from the signal transmitting device 300, wherein the signal transmitting device 300 has a low power mode and a high power mode. In the low power mode, the signal transmitting device 300 transmits the reference signal at a relatively low power. In the high power mode, the signal transmitting device 300 transmits the reference signal at a relatively high power. In addition, the server 100 may transmit a configuration command to the signal transmitting device 300 through the transceiver 200, thereby configuring the signal transmitting device 300 to switch to the low power mode or the high power mode.

Figure 2:
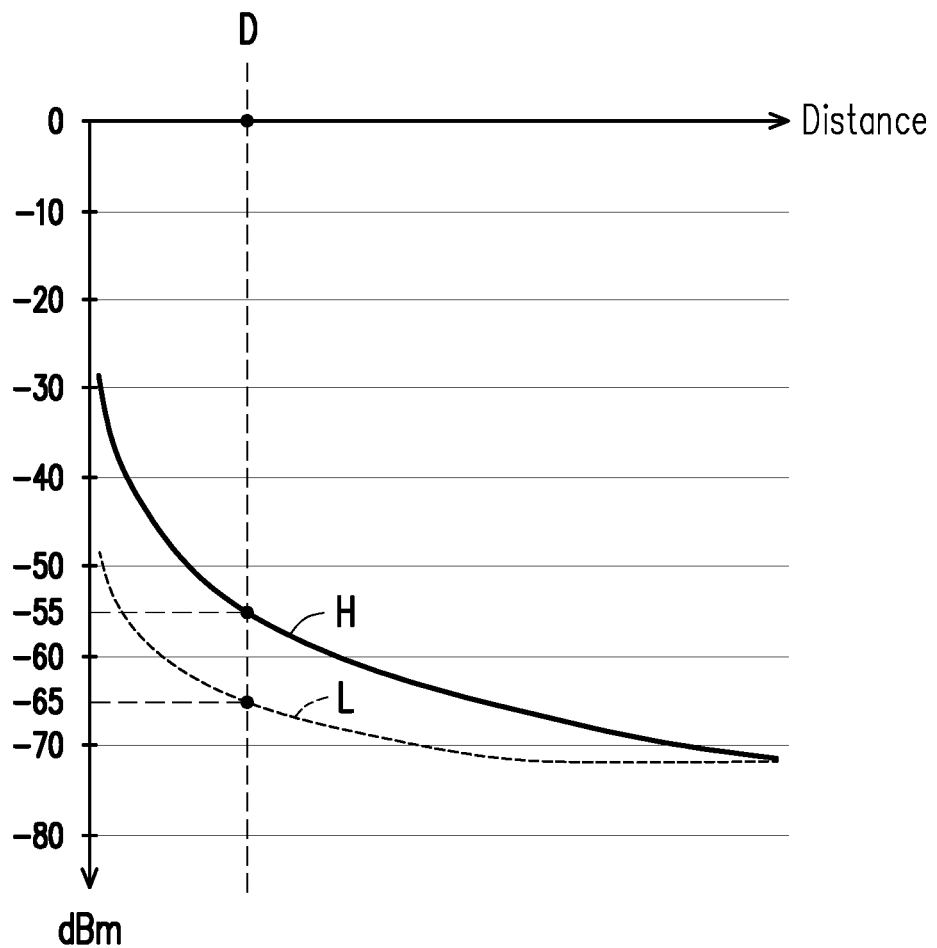
FIG. 2 is a schematic diagram showing signal strength and distance curve diagram according to an embodiment of the present disclosure.

The server 100 is coupled to the receiver 200 and may store a signal strength and distance curve diagram. The server 100 may determine the position of the signal transmitting device 300 according to the reference signal received by the transceiver 200 and the signal strength and distance curve diagram. FIG. 2 is a schematic diagram showing signal strength and distance curve diagram according to an embodiment of the present disclosure. The signal strength and distance curve diagram may include a signal strength and distance curve H (hereinafter referred to as "curve H") and a signal strength and distance curve L (hereinafter referred to as "curve L"), wherein the curve H corresponds to the high power mode of the signal transmitting device 300, and the curve L corresponds to the low power mode of the signal transmitting device 300. In this embodiment, the vertical axis of the signal strength and distance curve diagram represents the signal strength of the reference signal, and the signal strength may be, for example, a received signal strength indicator (RSSI). The horizontal axis of the signal strength and distance curve diagram represents the distance between the signal transmitting device 300 and the transceiver 200. According to one embodiment of the present disclosure, when the distance between the signal transmitting device 300 and the transceiver 200 is 50 cm and the received signal strength indicator is −30 dBm, the transmitting device 300 is operated in the high power mode. When the distance between the signal transmitting device 300 and the transceiver 200 is 50 cm and the received signal strength indicator is −50 dBm, the transmitting device 300 is operated in the lower power mode, but the disclosure is not limited thereto.

When the distance between the signal transmitting device 300 and the transceiver 200 is longer, the curve H and the curve L tend to be flat (i.e., the slope is reduced). When the signal transmitting device 300 is moved, the signal strength of the reference signal received by the transceiver 200 varies less. Therefore, it is relatively difficult for the server 100 to determine the position of the signal transmitting device 300 after moving according to the change of the signal strength. In other words, the flatter the signal strength and distance curve, the more difficult it is for the server 100 to accurately position the signal transmitting device 300 according to the signal strength and distance corresponding to the curve.

As can be seen from FIG. 2, when the distance between the signal transmitting device 300 and the transceiver 200 exceeds the distance D, the slope of the curve L is nearly zero, but the curve H still maintains a certain slope. Therefore, when the distance between the signal transmitting device 300 and the transceiver 200 exceeds the distance D, if the signal transmitting device 300 is switched to the high power mode, the server 100 may still accurately estimate the position of the signal transmitting device 300 according to the curve H. On the other hand, when the distance between the signal transmitting device 300 and the transceiver 200 is less than the distance D, the server 100 can accurately position the location of the signal transmitting device 300 solely based on the curve L. Therefore, the signal transmitting device 300 may be switched to the low power mode to save power consumption.

Referring back to FIG. 1, in the present embodiment, when the positioning system 10 starts positioning the signal transmitting device 300, the signal transmitting device 300 first transmits the initial reference signal in the low power mode. The transceiver 200 may receive the reference signal and transmit the reference signal to the server 100. The server 100 may determine the position of the signal transmitting device 300 according to the signal strength of the reference signal and the signal strength and distance curve diagram, and configure the signal transmitting device 300 to switch to the low power mode or the high power mode according to the position of the signal transmitting device 300. Since the initial reference signal is transmitted in the low power mode, the server 100 may determine the position of the signal transmitting device 300 according to the signal strength of the reference signal and the signal strength and distance curve (for example, the curve L shown in FIG. 2) corresponding to the low power mode, and configure the signal transmitting device 300 to switch to the low power mode or the high power mode according to the position of the signal transmitting device 300.

For example, the server 100 may preset the signal strength −55 dBm to a low power threshold, as shown in FIG. 2. When the strength of the reference signal transmitted by the signal transmitting device 300 in the low power mode is lower than the low power threshold, the server 100 may determine that the distance between the signal transmitting device 300 and the transceiver 200 exceeds the distance D (for example: the signal transmitting device 300 is located in the area B as shown in FIG. 1). Based on the above, the server 100 may configure the signal transmitting device 300 to switch to the high power mode according to the position of the signal transmitting device 300, so that the server 100 can perform relatively accurate positioning of the signal transmitting device 300 according to the curve H. When the strength of the reference signal transmitted by the signal transmitting device 300 in the low power mode is higher than the low power threshold, the server 100 may determine that the distance between the signal transmitting device 300 and the transceiver 200 is less than the distance D (for example, the signal transmitting device 300 is located in the area A as shown in FIG. 1). Based on the above, the server 100 may configure the signal transmitting device 300 to maintain in the low power mode according to the position of the signal transmitting device 300, thereby saving the power required for the signal transmitting device 300 to transmit the reference signal.

Alternatively, the server 100 may preset the signal strength of −45 dBm to a high power threshold, as shown in FIG. 2. When the strength of the reference signal transmitted by the signal transmitting device 300 in the high power mode is lower than the high power threshold, the server 100 may determine that the distance between the signal transmitting device 300 and the transceiver 200 exceeds the distance D (for example: the signal transmitting device 300 is located in the area B as shown in FIG. 1). Based on the above, the server 100 may configure the signal transmitting device 300 to maintain in the high power mode according to the position of the signal transmitting device 300, so that the server 100 can perform more accurate positioning of the signal transmitting device 300 according to the curve H. When the strength of the reference signal transmitted by the signal transmitting device 300 in the high power mode is higher than the high power threshold, the server 100 may determine that the distance between the signal transmitting device 300 and the transceiver 200 is less than the distance D (for example, the signal transmitting device 300 is located in the area A as shown in FIG. 1). Based on the above, the server 100 may configure the signal transmission device 300 to switch to the low power mode according to the position of the signal transmission device 300, thereby saving the power consumption required for the signal transmission device 300 to transmit the reference signal.

In some embodiments, the signal transmitting device 300 may cyclically transmit a reference signal, and the transceiver 200 may cyclically receive the reference signal. The server 100 may determine the position of the signal transmitting device 300 according to the signal strength of the reference signal received in each cycle, and determine whether the power mode of the signal transmitting device 300 needs to be switched. In some embodiments, the server 100 may switch the signal transmitting device 300 from the high power mode to the low power mode based on that the signal transmitting device 300 has been static for a period of time.

Figure 3:
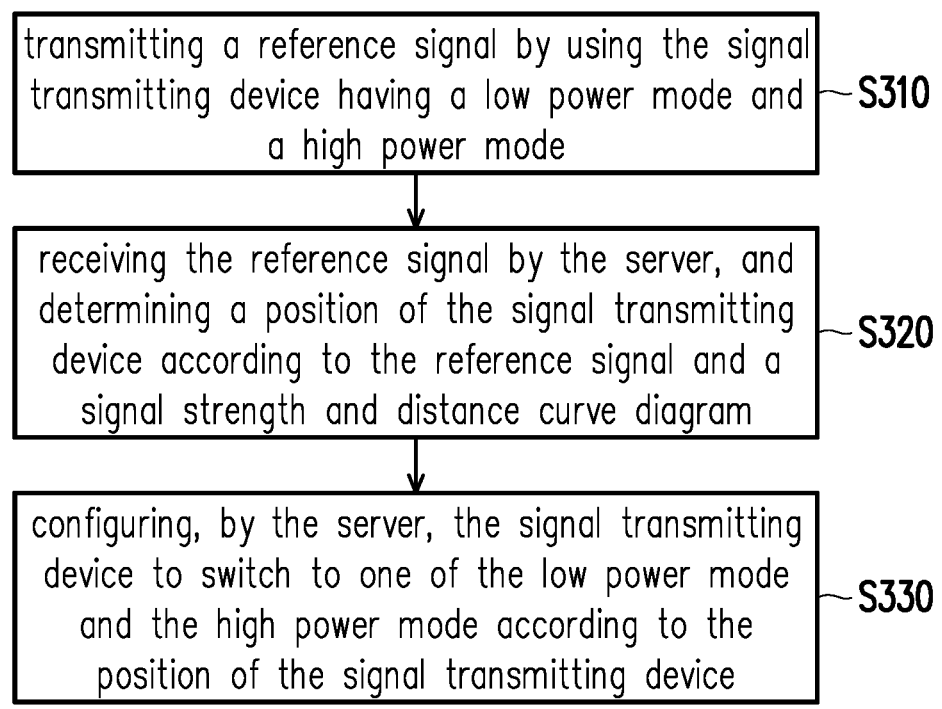
FIG. 3 is a flow chart showing a positioning method according to an embodiment of the present disclosure.

FIG. 3 is a flow chart showing a positioning method that may be implemented by the positioning system 10 as shown in FIG. 1 according to an embodiment of the present disclosure. In step S310, the reference signal is transmitted by using the signal transmitting device having the low power mode and the high power mode. In step S320, the reference signal is received by the server (for example, the server may receive the reference signal through the transceiver), and the position of the signal transmitting device is determined according to the reference signal and the signal strength and distance curve diagram. In step S330, the signal transmitting device is configured by the server to switch to one of the low power mode and the high power mode according to the position of the signal transmitting device.

In summary, the signal transmitting apparatus of the present disclosure may have different power modes. When the signal transmitting device is far away, the server may determine the power mode used by the signal transmitting device according to the signal strength and the signal strength and distance curve diagram, and determine the position of the signal transmitting device. If the position of the signal transmitting device is closer to the transceiver, the server may switch the power mode of the signal transmitting device to the low power mode while maintaining a certain positioning accuracy, thereby achieving power saving effect.

Although the disclosure has been disclosed by the above embodiments, the embodiments are not intended to limit the disclosure. It will be apparent to those skilled in the art that various modifications and variations can be made to the structure of the disclosure without departing from the scope or spirit of the disclosure. Therefore, the protecting range of the disclosure falls in the appended claims.

What is claimed is:

1. A positioning system, comprising:
   a signal transmitting device, having a low power mode and a high power mode and transmitting a reference signal;
   a transceiver, receiving the reference signal; and
   a server, coupled to the transceiver and storing a signal strength and distance curve diagram, wherein the signal strength and distance curve diagram comprises a first curve corresponding to the low power mode and a second curve corresponding to the high power mode,
   wherein the server determines a position of the signal transmitting device according to a signal strength of the reference signal and the first curve in the low power mode, and configures the signal transmitting device to switch to the high power mode according to the signal strength of the reference signal and a low power threshold through the transceiver, and
   wherein the server determines the position of the signal transmitting device according to the signal strength of the reference signal and the second curve in the high power mode, and configures the signal transmitting device to switch to the low power mode according to the signal strength of the reference signal and a high power threshold through the transceiver.

2. The positioning system according to claim 1, wherein the signal transmitting device transmits an initial reference signal in the low power mode.

3. The positioning system according to claim 1, wherein the signal transmitting device cyclically transmits the reference signal, and the transceiver cyclically receives the reference signal.

4. The positioning system according to claim 1, wherein the server is further configured to perform:
   switching the signal transmitting device to the high power mode according to the signal strength of the reference signal being lower than the low power threshold; and
   switching the signal transmitting device to the low power mode according to the signal strength of the reference signal being higher than the high power threshold.

5. A positioning method, adapted for a signal transmitting device and a server, the positioning method comprising:
   transmitting a reference signal by using the signal transmitting device having a low power mode and a high power mode;
   receiving the reference signal by the server, and determining a position of the signal transmitting device according to the reference signal and a signal strength and distance curve diagram, wherein the signal strength and distance curve diagram comprises a first curve corresponding to the low power mode and a second curve corresponding to the high power mode; and
   configuring, by the server, the signal transmitting device to switch to one of the low power mode and the high power mode according to the position of the signal transmitting device,
   wherein the server determines the position of the signal transmitting device according to a signal strength of the reference signal and the first curve in the low power mode, and configures the signal transmitting device to switch to the high power mode according to the signal strength of the reference signal and a low power threshold through the transceiver, and
   wherein the server determines the position of the signal transmitting device according to the signal strength and the second curve in the high power mode, and configures the signal transmitting device to switch to the low power mode according to the signal strength and a high power threshold through the transceiver.

6. The positioning method according to claim 5, wherein the signal transmitting device transmits an initial reference signal in the low power mode.

7. The positioning method according to claim 5, further comprising:

receiving the reference signal cyclically by the server, wherein the signal transmitting device cyclically transmits the reference signal.

8. The positioning method according to claim 5, wherein the step of configuring, by the server, the signal transmitting device to switch to one of the low power mode and the high power mode according to the position comprises:

switching the signal transmitting device to the high power mode according to the signal strength of the reference signal being lower than the low power threshold; and switching the signal transmitting device to the low power mode according to the signal strength of the reference signal being higher than the high power threshold.

* * * * *